United States Patent [19]

Gutmann

[11] Patent Number: 5,105,651
[45] Date of Patent: Apr. 21, 1992

[54] METHOD OF AND APPARATUS FOR ANALYZING EXHAUST GASES OF MOTOR VEHICLES

[75] Inventor: Kurt Gutmann, Breisach-Hochstetten, Fed. Rep. of Germany

[73] Assignee: Gutmann Messtechnik AG, Hergiswill, Switzerland

[21] Appl. No.: 554,297

[22] Filed: Jul. 17, 1990

[30] Foreign Application Priority Data

Jul. 18, 1989 [DE] Fed. Rep. of Germany ....... 3923737

[51] Int. Cl.$^5$ ........................................... G01M 15/00
[52] U.S. Cl. .................................. 73/23.31; 73/118.1
[58] Field of Search .................. 73/23.2, 23.31, 23.23, 73/117.3, 118.1, 23.31; 422/98

[56] References Cited

U.S. PATENT DOCUMENTS

| | | | |
|---|---|---|---|
| 3,917,454 | 11/1975 | Clark | 73/23.31 |
| 3,969,932 | 7/1976 | Rieger et al. | 73/118.1 |
| 4,441,359 | 4/1984 | Ezoe | 73/117 |
| 4,691,562 | 9/1987 | Abthoff et al. | 73/118.1 |
| 4,782,690 | 11/1988 | Terasaka | 73/116 |
| 5,041,265 | 8/1991 | Koike et al. | 73/23.2 |

FOREIGN PATENT DOCUMENTS

| | | |
|---|---|---|
| 0096514 | 12/1983 | European Pat. Off. . |
| 0239744 | 10/1987 | European Pat. Off. . |
| 2304464 | 8/1974 | Fed. Rep. of Germany . |
| 2643739 | 3/1978 | Fed. Rep. of Germany . |
| 2752862 | 5/1979 | Fed. Rep. of Germany . |
| 2951316 | 7/1981 | Fed. Rep. of Germany . |
| 3144349 | 5/1983 | Fed. Rep. of Germany . |
| 3232416 | 3/1984 | Fed. Rep. of Germany . |
| 3438172 | 4/1986 | Fed. Rep. of Germany . |
| 3443649 | 6/1986 | Fed. Rep. of Germany . |
| 3516981 | 11/1986 | Fed. Rep. of Germany . |
| 3534033 | 4/1987 | Fed. Rep. of Germany . |
| 3634873 | 4/1987 | Fed. Rep. of Germany . |
| 3736259 | 7/1988 | Fed. Rep. of Germany . |
| 3809082 | 10/1988 | Fed. Rep. of Germany . |
| 269673 | 7/1989 | German Democratic Rep. . |

OTHER PUBLICATIONS

"Messung von Automobilabgasen bei Strassenfahrten", Dieter Schürmann and Joachim Staab, Motortechnische Zeitschrift 48 (1987), pp. 35-39.
Car Service Manual (1982 Edition), Mobil Oil Corp., pp. 261-269.

Primary Examiner—Jerry W. Myracle
Attorney, Agent, or Firm—Peter K. Kontler

[57] ABSTRACT

Exhaust gases of a motor vehicle wherein the exhaust pipe contains a three-way catalytic converter downstream of a lambda sensor are sampled by a standard HC and CO detector downstream of the converter and the corresponding signals are transmitted to a computer which stores reference signals denoting the desired parameters of exhaust gases in a particular vehicle. The computer further receives signals from the lambda sensor, either directly or by way of a separate memory. The latter can be installed in and can be transported by the motor vehicle to memorize signals from the sensor while the vehicle is in motion. The computer compares signals from the memory and signals from the detector with stored reference signals. The testing can be carried out in several stages. For example, a complete test can include a first stage while the engine is still cold and the computer receives signals from the detector, a second stage while the vehicle is in motion and transports the computer and/or the memory, and thereafter a third stage while the engine is hot and the computer receives signals from the detector.

9 Claims, 2 Drawing Sheets

METHOD OF AND APPARATUS FOR ANALYZING EXHAUST GASES OF MOTOR VEHICLES

BACKGROUND OF THE INVENTION

The invention relates to motor vehicles in general, and more particularly to improvements in methods of and in apparatus for analyzing and evaluating exhaust gases of motor vehicles. Still more particularly, the invention relates to improvements in methods of and in apparatus for analyzing and evaluating exhaust gases of motor vehicles wherein the exhaust pipe contains a three-way catalytic converter downstream of a lambda sensor.

It is already known to sample the exhaust gases by resorting to a so-called ASU measurement which involves a determination of the HC and/or CO content of exhaust gases issuing from the exhaust pipe of a standing (idling) motor vehicle. A drawback of such procedure is that signals which are generated by the sampling means do not furnish sufficient information to complete an accurate evaluation of exhaust gases.

Detection of certain poisonous ingredients, such as nitrogen oxide, is possible only when the motor vehicle is in motion and is under load. Thus, such sampling of exhaust gases in accordance with heretofore known proposals necessitates the utilization of a complex and expensive roller bench.

It was further proposed to subject exhaust gases to a more elaborate analysis by running, for a predetermined interval of time, the engine of a motor vehicle which is supported by a roller type dynamometer, also called roller bench or test stand. Gases which issue from the exhaust pipe are mixed with filtered atmospheric air at a constant ratio, and a portion of the thus obtained mixture is collected in bags for subsequent determination of the concentration of toxic and/or other undesirable ingredients. A drawback of such proposal is that the testing involves the utilization of a test stand as well as of complex and expensive evaluating instruments and apparatus. Therefore, such methods can be practiced only by a few large or giant organizations which can afford the necessary apparatus including test stands and other costly equipment.

The article by Schürmann and Staab on pages 35-39 of Motortechnische Zeitschrift 48 (1987) entitled "Measurements of the Exhaust Mass Emissions in Vehicles on the Road" describes a prototype which was built into a Volkswagen vehicle and wherein the exhaust gases must be mixed with air prior to passing through a condensate separator and a filter which forms part of an exhaust gas processing unit. A computer evaluates the signals which are supplied by the processing unit, and the computer further receives signals from a fuel flow meter and a speedometer.

U.S. Pat. No. 4,782,690 to Terasaka discloses an air/fuel ratio detecting apparatus and a method of detecting an abnormal condition of the apparatus.

U.S. Pat. No. 4,441,359 to Ezoe discloses a method of and an apparatus for testing vehicles. The apparatus employs an exhaust gas tester which samples gases at the discharge end of the exhaust pipe and transmits signals to a central control device employing a programmable microcomputer.

Published European patent application No. 0 096 514 of Parker discloses a detector of combustible or combustion-supporting constituents of exhaust gases which issue from internal combustion engines.

Published German patent application No. 29 51 316 of Bozon et al. discloses a catalytic filter for purification of exhaust gases issuing from diesel engines.

Published German patent application No. 38 09 082 of Klingenberg discloses an apparatus for simultaneous analysis of several samples of exhaust gases. The exhaust gases are withdrawn upstream and downstream of a catalytic converter and are conveyed to a single analyzing unit by way of a single multi-way valve.

Published German patent application No. 32 32 416 of Kraft et al. discloses a data gathering and processing system for use in motor vehicles. The system is designed to cyclically receive data from a plurality of monitoring devices, and the processed information can be displayed or printed.

Published German patent application No. 34 38 172 of Marte Electronic discloses an exhaust gas evaluating apparatus which employs a sensor serving to ascertain and to display typical emission values. The sensor cooperates with a data adapter which transmits to a memory data pertaining to typical emission values.

Published European patent application No. 0 239 744 of Siemens discloses a sensor and a method of cleaning conduits for flue gases.

Published German patent application No. 2 304 464 of Neidhard et al. discloses a sensor which is designed to monitor the operativeness of catalytic converters in detoxicating units for exhaust gases.

East German Pat. No. 269 673 to Heinze et al. discloses an apparatus for and a method of testing oxidative catalytic converters.

Published German patent application No. 27 52 862 of Gruden discloses a method of testing exhaust gases which issue from an internal combustion engine. The method involves ascertaining the timing of ignition during idling, a monitoring of the so-called air number lambda during idling, and at least one monitoring of the air number lambda at rotational speeds along the zero load line.

Published German patent application No. 26 43 739 of Vössner" discloses a method of monitoring the operation of catalytic converters in exhaust pipes. The method is practiced by employing two temperature sensors serving to generate signals when the catalytic converter is no longer capable of performing its function.

Published German patent application No. 35 16 981 of Vrang et al. discloses a method which is similar to or identical with the method of Vössner.

Published German patent application No. 37 36 259 of Kluczynski discloses a motor vehicle with an electronic control unit which can be switched from normal operation to determination of the degree of convertibility of a catalytic converter in the exhaust pipe of the vehicle.

Published German patent application No. 35 34 033 of Chassiotis discloses a method of ascertaining the fuel consumption and the percentage of emission of toxic products by an Otto engine. The inventor relies upon a specific formula. The concentration of toxic ingredients in exhaust gases is measured while the engine is idling at a lower RPM and at a higher RPM.

Published German patent application No. 31 44 349 of Melzer discloses an adjustable soot combusting unit for use in the exhaust system of a diesel engine.

OBJECTS OF THE INVENTION

An object of the invention is to provide a method of analyzing and evaluating exhaust gases which can be practiced while a vehicle is at a standstill or in motion so that it is not necessary to employ a test stand.

Another object of the invention is to provide a method which can be practiced by resorting, at least in part, to available instruments and other pieces of equipment.

A further object of the invention is to provide a simple, compact and inexpensive apparatus for the practice of the above outlined method.

An additional object of the invention is to provide an apparatus which can employ certain standard components of motor vehicles.

Still another object of the invention is to provide an apparatus which can be carried by a vehicle during testing of the vehicle and which renders it possible to test one and the same vehicle during standstill or while the wheels of the vehicle are in motion on a road rather than on a test stand.

SUMMARY OF THE INVENTION

One feature of the present invention resides in the provision of a method of analyzing and evaluating exhaust gases which issue from the exhaust pipe of a motor vehicle wherein the exhaust gases pass through an adjustable three-way catalytic converter which is installed downstream of a lambda sensor. The improved method comprises the steps of memorizing first signals which are transmitted by the sensor during at least one stage of operation of the vehicle (e.g., while the vehicle is at a standstill and is idling or while the vehicle is in motion of the road), sampling the exhaust gases in the exhaust pipe downstream of the catalytic converter and generating second signals which denote certain parameters of sampled exhaust gases, storing reference signals which denote the desired parameters of exhaust gases for a vehicle type corresponding to that of the tested vehicle, and comparing the stored reference signals with the first signals and/or with the second signals.

The memorizing step can be carried out while the vehicle is in motion, and the signals from the lambda sensor can be memorized for a period of at least two minutes, particularly for a period of two to four minutes.

The sampling step can comprise ascertaining the CO and HC contents of exhaust gases downstream of the catalytic converter and transmitting the corresponding second signals to a computer which stores the reference signals. The comparing step follows the step of transmitting the second signals The method can further comprise the step of displaying information which denotes the differences between stored reference signals and the first and/or second signals when such differences are ascertained in the course of the comparing step. The information can be displayed visibly and/or audibly, e.g., on a screen, by printing the information on a sheet or web of paper or another carrier of information, or otherwise.

As mentioned above, the reference signals can be stored in a computer which receives first signals from the lambda sensor and second signals after elapse of first and second intervals following the starting of a cold engine. Such method can further comprise the steps of measuring the first and second intervals, transmitting to the computer additional information denoting the measured intervals, and processing the additional signals with the first and second signals.

The at least one stage can involve idling the engine at approximately 1000 RPM, and the method can further comprise the steps of memorizing, sampling and comparing while the engine is operated under no-load conditions at approximately 3000 RPM, and utilizing the results of the two comparing steps for determination of the efficiency and/or condition of the catalytic converter.

Another feature of the invention resides in the provision of an apparatus for evaluating exhaust gases which issue from the exhaust pipe of a motor vehicle wherein the exhaust pipe contains an adjustable three-way catalytic converter downstream of a lambda sensor which transmits first signals denoting, for example, the oxygen content of exhaust gases. The apparatus comprises a memory having input means for first signals, means for sampling exhaust gases downstream of the catalytic converter and for transmitting second signals denoting predetermined parameters of exhaust gases, and means for storing reference signals denoting the desired parameters of exhaust gases. The storing means has input means for the first and second signals, and such storing means is operative to compare the reference signals with the first and second signals.

The parameters which are sampled by the sampling means can include the CO content and the HC content of exhaust gases.

The memory can be a portable memory having at least one output and being designed to be installed in or to be carried by the motor vehicle during testing. The storing means can comprise a stationary computer, and the apparatus can further comprise means for separably connecting the at least one output of the portable memory with the respective input means of the computer. Alternatively, the memory can form part of the storing means, and the storing means can comprise a portable computer which is designed to be installed in or to be carried by the motor vehicle during evaluation of exhaust gases.

The apparatus can comprise means for establishing a direct electrical connection between the storing means and the sampling means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
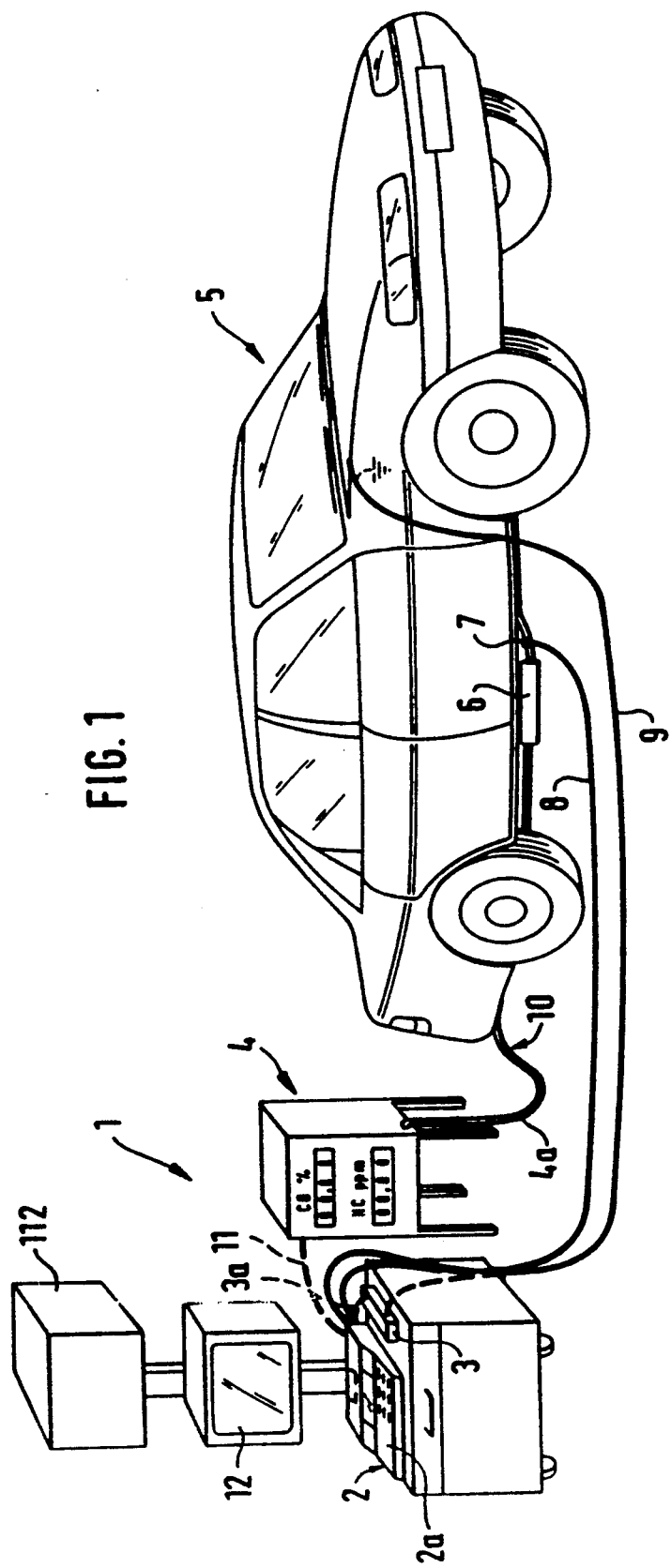
FIG. 1 is a perspective view of a motor vehicle with the engine idling and with an apparatus which embodies one form of the invention in the process of analyzing exhaust gases issuing from the exhaust pipe which contains a three-way catalytic converter downstream of a lambda sensor.

Referring first to FIG. 1, there is shown an apparatus 1 which can be used to carry out an analysis and an evaluation of exhaust gases issuing from the exhaust pipe 10 of a motor vehicle 5. The engine of the vehicle 5 is on and is idling, i.e., the vehicle is at a standstill. The apparatus 1 comprises a computer 2 which has a memory for storage of reference signals denoting the desired parameters of exhaust gases issuing from the exhaust pipe of a particular motor vehicle, e.g., a sedan of U.S., German, Japanese or other make. The computer 2 has one or more inputs which are separably connected with one or more outputs of a discrete memory 3 for temporary storage of (first) signals supplied by a conventional lambda sensor 7 which is installed in the exhaust pipe 10 upstream of an adjustable three-way catalytic converter 6 and is connected with the memory 3 by a cable 8 or any other suitable conductor. The computer 2 is further connected to a grounded part of the motor vehicle 5 (by a conductor 9) and is separably connected with an output of a sampling instrument or detector 4. The detector 4 includes a hose 4a which is shown as being inserted into the outlet of the exhaust pipe 10. The detector 4 can be of any standard design and serves to ascertain the CO and HC contents of exhaust gases downstream of the catalytic converter 6. The reference character 3a denotes a conductor which separably connects an output of the memory 3 with an input of the computer 2.

The memory 3 is sufficiently small to find room in the passenger compartment, in the trunk or elsewhere in the motor vehicle 5. Alternatively, and if the memory 3 forms an integral part of the computer 2 (note FIG. 2) the entire computer is designed as a portable unit which can be confined in the passenger compartment, in the trunk or elsewhere in the motor vehicle 5. In other words, signals which are transmitted by the sensor 7 can be memorized for a selected interval of time (e.g., 2 to 4 minutes) while the vehicle 5 is at a standstill or while the vehicle is in motion.

A complete test can be carried out in the following way: The cold engine of the vehicle 5 is started and the vehicle remains at a standstill (i.e., the engine is idling) in the course of a first stage or cycle of a complete multi-stage testing operation. The next stage involves analyzing the exhaust gases (particularly the NO content as determined by the sensor 7) while the vehicle is in motion on a road (i.e., the wheels of the vehicle need not be caused to rotate on the rollers of a test stand) and while the engine is under load. The next (e.g., last) stage of testing is carried out while the engine is hot and is idling. It will be seen that such three-stage test can be completed by resorting to a relatively simple and compact apparatus and without the need to employ a test stand. This renders it possible to practice the improved method and to use the improved apparatus in relatively small establishments which could not afford the aforediscussed conventional apparatus of the type designed to carry out certain important tests only while the wheels of the vehicle rotate on the rollers of a test stand.

Figure 2:
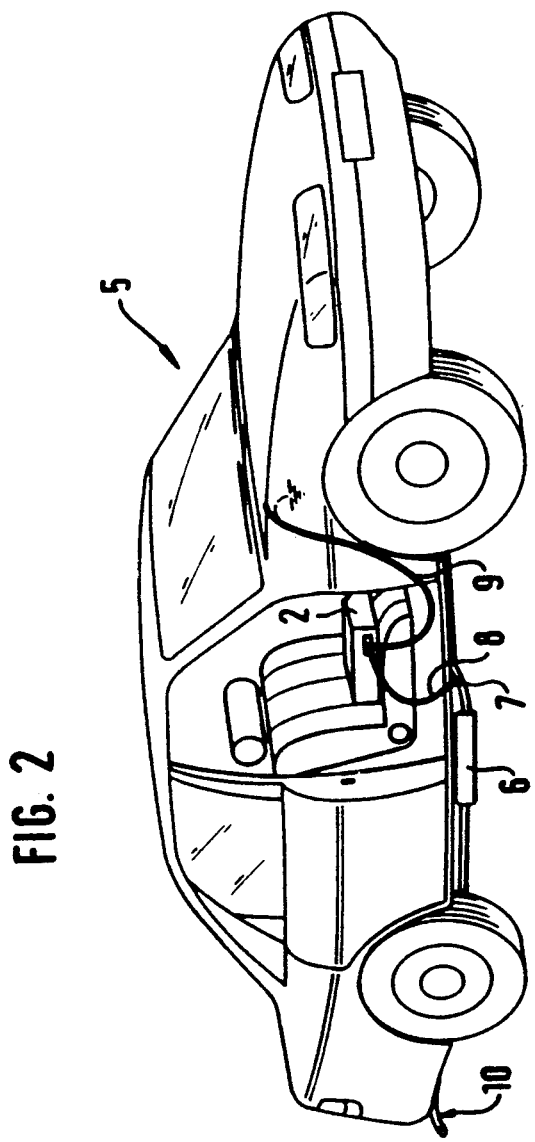
FIG. 2 is a perspective view of a second vehicle and of a modified apparatus wherein the output of the lambda sensor is directly connected with a computer on the passenger seat of the motor vehicle.

In order to carry out a test, the conductor 8 is put to use to connect the output of the lambda sensor 7 with the memory 3 of FIG. 1 or with the corresponding input of the computer 2 of FIG. 2, and the conductor 9 is put to use to connect the computer 2 with a grounded part of the vehicle 5. The hose 4a of the detector 4 is connected to the discharge end of the exhaust pipe 10, i.e., the hose 4a receives exhaust gases downstream of the catalytic converter 6. The engine of the motor vehicle 5 is assumed to be cold; then the cold engine is started, the detector 4 samples the exhaust gases and registers the CO and HC contents downstream of the catalytic converter 6. In addition, the conductor 8 transmits to a counter or timer of the memory 3 and/or computer 2 an additional signal denoting the interval of time which elapses from the instant of starting the engine to the instant when the sensor 7 is set in operation. Still further, the computer 2 receives an additional signal which denotes the length of the interval of time elapsing from the instant of starting the cold engine and the instant when the catalytic converter 6 is set in operation. Such additional signals are processed with signals which are transmitted by the sensor 7 and detector 4. The latter transmits to the computer 2 (second) signals which denote the CO and HC contents of exhaust gases at the discharge end of the exhaust pipe 10.

The apparatus of FIG. 1 can be simplified if the connection 11 between the detector 4 and the computer 2 is omitted and the person in charge reads the information which is displayed by the detector 4 to transmit such information to the computer 2 by way of a keyboard 2a.

The computer 2 is connected with a unit 12 which displays the results of measurements, particularly deviations (if any) of first signals (from the sensor 7) and/or second signals (from the detector 4) from reference signals which are stored in the memory of the computer and denote the desired parameters of exhaust gases issuing from the exhaust pipe of the particular (tested) motor vehicle 5. In addition, the unit 12 can serve to display data which are furnished by the sensor 7 and/or detector 4. The illustrated display unit 12 can be replaced by or used in conjunction with a printer 112 which furnishes a printed record of information pertaining to data supplied by the sensor 7 and/or detector 4 and/or the information which is furnished by the computer 2 and denotes deviations of signals generated by the sensor 7 and/or detector 4 from corresponding reference signals in the memory of the computer 2.

When the first testing stage (including the interval immediately following starting of the cold engine) is completed, the person in charge can immediately proceed with the next stage which involves analyzing and evaluating exhaust gases while the vehicle 5 is in motion under load. To this end, the memory 3, or the memory 3 and the computer 2, or only the computer 2 (if the memory 3 is embodied in the computer) is placed into the passenger compartment of or is otherwise accommodated in the motor vehicle 5 so that the vehicle can be driven on a selected road. As shown in FIG. 2, the computer 2 (which is assumed to embody a memory replacing the memory 3 of FIG. 1) is connected (by conductor 8) with the sensor 7 and the computer is also connected with a grounded part of the vehicle 5 (via conductor 9). The discharge end of the exhaust pipe 10 is disconnected from the hose 4a of the detector 4. Signals which are transmitted by the sensor 7 via conductor 8 are stored in the memory (3) of the computer 2 while the vehicle 5 is in motion. As a rule, the vehicle 5 will be driven in accordance with a preselected pattern; for example, the vehicle will be caused to travel at a preselected speed for a predetermined interval of time. This second stage of testing can also involve coasting of the vehicle.

The next testing stage involves idling of the hot engine and connection of the hose 4a to the discharge end of the exhaust pipe 10. The computer 2 then receives signals from the detector 4 and, at the same time, receives signals from the memory 3 or from its own memory (if the memory 3 is embodied in the computer). Thus, the third stage is carried out while the engine is heated up but is idling so that the hose 4a of the detector 4 can be connected to the discharge end of the exhaust pipe 10.

The computer 2 evaluates the signals which are transmitted to its inputs during the three testing stages, and such evaluation can involve (and often involves) a comparison of signals from the sensor 7 and detector 4 with reference signals which are stored in the computer and denote the desired parameters of exhaust gases of the tested vehicle 5. The memory of the computer 2 can store a number of sets of reference signals, one set for each of a series of different motor vehicles 5, so that one and the same computer can be used for effective testing of exhaust gases of numerous types and makes of motor vehicles. The reference signals or data which are stored in the memory of the computer 2 can be of the type known as Typ-Prüf US FTP 75-values and/or US FTP 75 US 83/87 values.

The results of the evaluating operation can be displayed by the unit 12 and/or recorded by the printer 112.

The test can be carried out indoors or outdoors at temperatures between 10° C. and 30° C. Thus, it is normally not necessary to heat or cool the indoor testing facility which entails substantial savings in energy. A multi-stage test can be completed within a period of 10 to 15 minutes, i.e., the engine can be tested while it is cold, while the vehicle is in motion under load and while the engine is hot and idling, and the three stages of such test can be completed in not more than 15 minutes.

The computer 2 can be used as a means for ascertaining the efficiency of the catalytic converter 6 with a very high degree of accuracy. Experiments indicate that the accuracy of the efficiency test has an error factor of not more than ±5 percent. The reason is that the computer 2 can process data which are obtained as a result of testing under a large number of different circumstances including testing after a cold start, testing while the engine is under load, testing while the hot engine is idling, and so on.

The conductor 8 can be readily affixed to a lambda sensor which is already installed in the exhaust pipe of a motor vehicle to transmit signals to the memory 3 or directly to the computer 2 if the latter embodies the memory 3 or an equivalent thereof. This does not necessitate any complex manipulations of the conductor for the lambda sensor and/or a separation of an existing conductor which transmits signals from the lambda sensor.

The signals which are transmitted by the computer 2 can be utilized to determine the rate of aging or the actual efficiency of the catalytic converter 6. This can be accomplished in the following way: The engine is started and is caused to idle at say 1000 RPM. During such idling, the person in charge carries out a test with the detector and simultaneously with the lambda sensor 7. The measurements are repeated while the engine is idling (no-load conditions) at a higher rotational speed to increase the exhaust gas output. For example, a second test can be carried out while the RPM of the idling engine is between approximately 2500 and 3000. The computer 2 processes the thus obtained data and calculates the efficiency of the catalytic converter 6. If there is no appreciable difference between the ascertained efficiencies following the first and second tests, this warrants the conclusion that the operation of the catalytic converter as well as of the engine is satisfactory.

On the other hand, if the departure of efficiency which is calculated on the basis of a first test from the efficiency which is ascertained on the basis of a second test is outside of a predetermined range, the computer 2 or another component is used to ascertain the actual efficiency on the basis of characteristic data for the engine which are stored in the computer and are normally or invariably ascertained on the basis of measurements under load. This results in determination of an additional reduction of the efficiency of the converter (in comparison with the measured reduction of efficiency at, for example, 3000 RPM) which corresponds to the actual efficiency during operation under load.

It will be seen that the improved apparatus 1 can be used to ascertain, while the motor vehicle is at a standstill, whether or not the operation of the catalytic converter is still satisfactory. Thus, it is possible to ascertain whether or not the catalyst is still satisfactory after a certain period of use, e.g., while the odometer reading has risen by 100000 kilometers. As a rule, the effectiveness of the converter decreases with age and a reduction of the catalyst. The computer 2 can be used to ascertain the extent to which the conversion rate (i.e., the effectiveness of the converter) has decreased as a result of aging.

The testing with the apparatus 1 can also serve to ascertain whether or not the tuning of the engine is satisfactory. For example, if the difference between the efficiencies at, for example, 1000 and 3000 RPM exceeds a certain range, this could be attributed to improper tuning or adjustment of the engine. In fact, if the difference between the efficiencies at two different rotational speeds exceeds a given range, the computer 2 can be utilized to analyze the engine and to indicate the defects, if any. For example, the CO content upstream of the catalytic converter 6 can be too high or too low, the regulation in response to signals from the sensor 7 can be unsatisfactory, and so forth. Once the computer 2 has detected the presence of a defect, the person in charge is much more likely to ascertain the exact nature of the defect with very little loss in time. The test or tests can be repeated when the repair work upon the engine is completed in order to ascertain whether or not the repairman has actually eliminated that defect which has caused the apparatus 1 to furnish readings denoting one or more defects in the engine.

Lambda sensors and adjustable three-way catalytic converters are standard parts of many types of motor vehicles. Reference may be had, for example, to pages 261 to 269 of the Mobil Car Service Manual, 1982 Edition. Furthermore, lambda sensors are described in published German patent application No. 34 43 649 of Abthoff et al. which refers, among others, to an article by Glöckler entitled "Advances in closed-loop lambda-controlled fuel injection systems meant to meet most stringent emission levels" (Proc. Int. Symposium on Automotive Technology and Automation, ISATA 81, Stockholm, Sept. 7 to 11, 1981, Volume 1, pages 308-326, published by Automotive Automation Ltd., Croydon, England). Reference may also be had to published German patent application No. 36 34 873 of Inamoto et al.

Since the sensor 7 and the catalytic converter 6 constitute standard components of many motor vehicles, it is merely necessary to employ a conventional detector 4 (which is available in all or practically all repair shops and similar establishments) so that the overall cost of the improved apparatus 1 is sufficiently low to permit its utilization not only by large organizations but also by medium sized and small as well as very small establishments. An expensive component of many presently known exhaust gas evaluating and analyzing apparatus, namely a test stand, is not needed for the practice of the improved method.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of evaluating and analyzing exhaust gases issuing from the exhaust pipe of a motor vehicle wherein the exhaust gases pass through an adjustable three-way catalytic converter which is installed downstream of a lambda sensor, comprising the steps of memorizing for a period of at least 2 minutes, particularly a period of 2-4 minutes, first signals which are transmitted by the sensor while the vehicle is in motion; sampling the exhaust gases in the exhaust pipe downstream of the catalytic converter and generating second signals denoting the parameters of exhaust gases; storing reference signals denoting the desired parameters of exhaust gases; and comparing the stored reference signals with said first signals and said second signals.

2. A method of evaluating and analyzing exhaust gases issuing from the exhaust pipe of a motor vehicle wherein the exhaust gases pass through an adjustable three-way catalytic converter which is installed downstream of a lambda sensor, comprising the step of memorizing first signals which are transmitted by the sensor during at least one stage of operation of the vehicle; sampling the exhaust gases in the exhaust pipe downstream of the catalytic converter and generating second signals denoting the parameters of exhaust gases; storing reference signals denoting the desired parameters of exhaust gases; and comparing the stored reference signals with said first signals and said second signals, said sampling step including ascertaining the CO and HC contents of exhaust gases downstream of the catalytic converter and transmitting the corresponding second signals to a computer which stores the reference signals, said comparing step following said step of transmitting said second signals.

3. The method of claim 2 further comprising the step of displaying information denoting the differences between the stored reference signals and the first and/or second signals when such differences are ascertained in the course of said comparing step.

4. A method of evaluating and analyzing exhaust gases issuing from the exhaust pipe of a motor vehicle wherein the exhaust gases pass through an adjustable three-way catalytic converter which is installed downstream of a lambda sensor, comprising the steps of memorizing first signals which are transmitted by the sensor during at least one stage of operation of the vehicle; sampling the exhaust gases in the exhaust pipe downstream of the catalytic converter and generating second signals denoting the parameters of exhaust gases; storing reference signals denoting the desired parameters of exhaust gases, said storing step including storing the reference signals in a computer which receives first signals from the sensor and second signals after elapse of first and second intervals following starting of a cold engine; measuring said first and second intervals; transmitting to the computer additional signals denoting the measured intervals; and processing the additional signals together with said first and second signals, including comparing the stored reference signals with said first signals and said second signals.

5. A method of evaluating and analyzing exhaust gases issuing from the exhaust pipe of a motor vehicle wherein the exhaust gases pass through an adjustable three-way catalytic converter which is installed downstream of a lambda sensor, comprising the steps of memorizing first signals which are transmitted by the sensor during at least one stage of operation of the vehicle, said at least one stage involving idling the engine at approximately 1000 RPM; sampling the exhaust gases in the exhaust pipe downstream of the catalytic converter and generating second signals denoting the parameters of exhaust gases; storing reference signals denoting the desired parameters of exhaust gases; comparing the stored reference signals with said first signals and said second signals; memorizing, sampling and comparing while the engine is operated under no-load conditions at approximately 3000 RPM; and utilizing the results of said comparing steps for determination of the efficiency of the catalytic converter.

6. Apparatus for evaluating and analyzing exhaust gases issuing from the exhaust pipe of a motor vehicle wherein the exhaust pipe contains an adjustable three-way catalytic converter downstream of a lambda sensor which transmits first signals, comprising a portable memory having input means for first signals; means for sampling exhaust gases downstream of the catalytic converter and for transmitting second signals denoting predetermined parameters of exhaust gases, said portable memory being designed to be installed in or to be carried by the motor vehicle during sampling of exhaust gases; and means for storing reference signals denoting the desired parameters of exhaust gases, said storing means having input means for said first and second signals and being operative to compare said reference signals with said first and second signals.

7. The apparatus of claim 6, wherein said storing means comprises a stationary computer and further comprising means for separably connecting said at least one output with the respective input means of said computer.

8. The apparatus of claim 6, further comprising means for establishing a direct electrical connection between said storing means and said sampling means.

9. Apparatus for evaluating and analyzing exhaust gases issuing from the exhaust pipe of a motor vehicle wherein the exhaust pipe contains an adjustable three-way catalytic converter downstream of a lambda sensor which transmits first signals, comprising a memory having input means for first signals; means for sampling exhaust gases downstream of the catalytic converter and for transmitting second signals denoting predetermined parameters of exhaust gases; and means for storing reference signals denoting the desired parameters of exhaust gases, said storing means having input means for said first and second signals and being operative to compare said reference signals with said first and second signals, said memory forming part of said storing means and said storing means comprising a portable computer which is designed to be installed in or to be carried by the motor vehicle during evaluation of exhaust gases.

* * * * *